Dec. 1, 1936.       N. D. CAMPBELL       2,062,638
VALVELESS INFLATABLE ARTICLE
Filed June 7, 1935

INVENTOR:
NICHOLAS DEMAREST CAMPBELL.
BY
Israel Benjamins,
ATTORNEY.

Patented Dec. 1, 1936

2,062,638

UNITED STATES PATENT OFFICE 2,062,638

VALVELESS INFLATABLE ARTICLE

Nicholas Demarest Campbell, Hackensack, N. J.

Application June 7, 1935, Serial No. 25,426

3 Claims. (Cl. 152—13)

My invention relates to improvements in valveless articles, such as valveless inner tubes for automobile tires, life preservers, toy figures and balloons, footballs, handballs, water-wings, life saving rafts and others; and means for inflating and deflating the same; and it consists in the novel features which are hereinafter described.

One of the objects of my invention is to eliminate the use of tube valves in automobile tire tubes and to provide a valveless inner tube for automobile tires.

Another object of my invention is to provide a more perfect means for readily inflating and deflating inner tubes of automobile tires and other articles.

A further object of my invention is to prevent loss of air or gas during the operation of inflating inner tubes of automobile tires and other articles.

A still other object of my invention is to have the said inflating and deflating means simple, light, portable, compact and inexpensive.

Other object and advantages will hereinafter appear.

I attain these objects by the valveless inner tube for automobile tires and the apparatus for inflating and deflating the same and other articles, which are illustrated in the accompanying drawing or by any mechanical equivalent or obvious modification of the same.

In the drawing Fig. 1 is a fragmentary front view partly in elevation and partly in section showing my above inflating means as applied to an automobile inner tube.

Similar numerals refer to similar parts throughout the several views.

Figure 1:
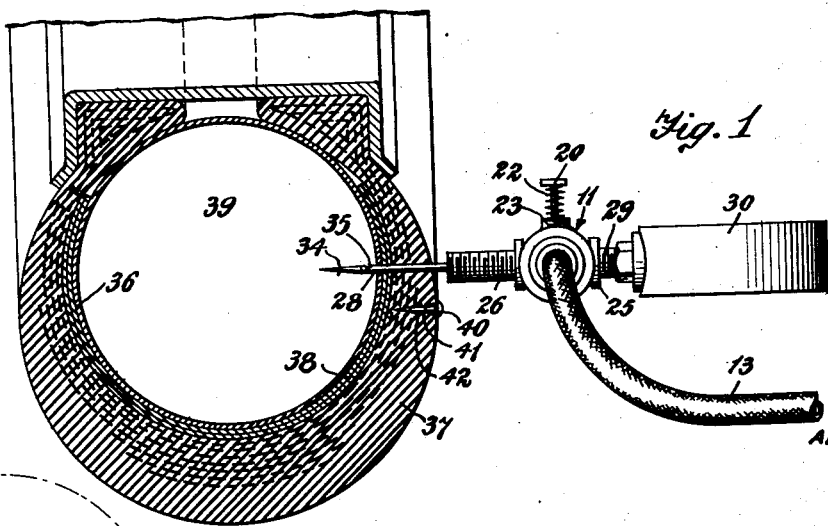
Figure 2:
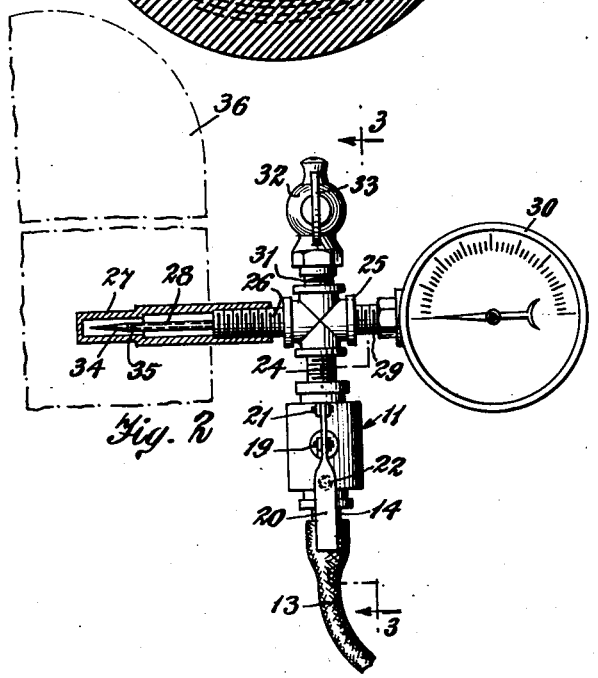
Fig. 2 is a plan view of the above apparatus.
Figure 3:
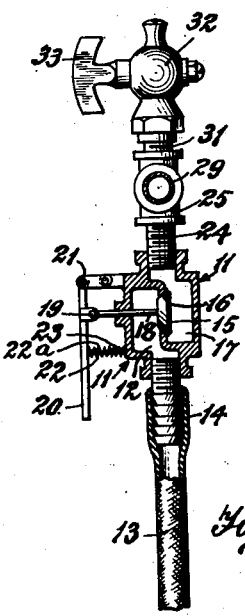
Fig. 3 is a side view of the said apparatus, mainly in elevation, looking from right to left in Fig. 2, and showing the valve chamber in section on the line 3—3 of Fig. 2.
Figure 4:
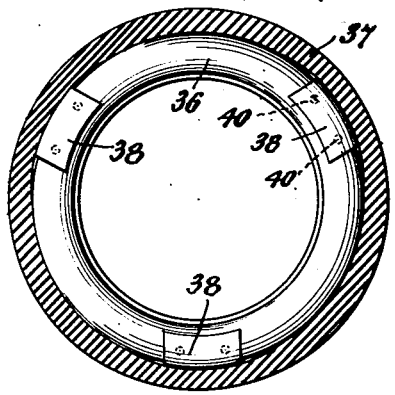
Fig. 4 is a detail in side view of a valveless inner tube, such as is made possible by my above inflating apparatus, and drawn to a relatively small scale.

11 designates a valve chamber for compressed air or gas which is admitted to the inlet space 12 thereof by means of a flexible tube 13 and a connection 14 to which one end of the tube 13 is detachably connected.

The other end of the tube 13 may be connected to any suitable source of compressed air or gas such as a hand pump, a power driven air compressor or a tank of compressed air or gas.

A valve 15 normally closes a passage 16 which leads from the inlet space 12 to an outlet space 17 of the chamber 11.

The valve 15 has thereon a stem 18 which is pivotally connected at 19 to an operating lever 20, which is pivotally connected at 21 to the chamber 11; and the valve 15 is normally kept closed by means of a compression spring 22 which is abutting at one end thereof against a part 23 on the chamber 11 and at the other end thereof against the inner side of the lever 20.

Pins 22a, on the part 23 and the lever 20 are provided to engage the ends of the spring 22.

The spring 22 may be otherwise disposed than as shown in the drawing, and some spring other than a compression spring may be employed, if desired.

The valve 15 may be opened by manually depressing the outer end of the lever 20 against the resistance of the spring 22.

From the space 17 the compressed air or gas passes through a nipple 24 to a fitting 25 which is shown as having the form of a cross and has connected thereto one end of a nipple 26 which is exteriorly threaded to receive thereon a cap 27, which is to serve as a shield for a hollow needle 28, which is connected to the other end of the nipple 26.

The fitting 25 is also shown as having connected thereto by means of a nipple 29 a pressure gauge 30 and by means of a nipple 31 a fitting 32 enclosing a discharge valve or petcock 33.

The needle 28 terminates in a solid end or point 34 and has thereon at a side thereof an opening 35 for the egress of compressed air or gas therethrough.

I propose to have one or more portions of an inner tube 36, which is enclosed by a shoe 37 of an automobile tire, covered by puncture sealing material 38 through which to insert the said needle 28 into the interior 39 of the tube 36 as shown in Fig. 1, whereby to admit compressed air or gas from the space 17 of the valve chamber 11 through the nipple 24, the fitting 25, the nipple 26 and the hollow needle 28 into the said interior 39.

On withdrawing the needle 28 from the tube 36 the puncture sealing material 38 will close up the aperture formed therein, by the needle 28 and prevent the escape of compressed air from the interior 39 of the tube 36.

It is evident that the above described inflating apparatus may be applied also for inflating articles other than inner tubes of automobile tires and in the same manner.

Fig. 1 shows the needle 28 as applied through an opening in the side of the shoe 37, through the puncture sealing material 38 and the side of the tube 36.

On releasing the lever 20 the flow of compressed air from the fitting 11 to the interior 39 of the tube 36 is discontinued.

To deflate an inner tube the needle 28 is inserted through an opening in the side of the shoe 37 into the interior 39 of the tube 36 and the petcock 33 in the fitting 32 is opened, thereby permitting the compressed air to escape from the interior 39 of the tube 36 through the needle 28, the nipple 26, the fitting 25, the nipple 31, the petcock 33 and fitting 32 into the atmosphere.

The inner tube 36 may be all covered by the puncture sealing material 38 if desired; however, from motives of economy only small portions thereof may be so covered.

The location of these portions of material 38 on the tube 36 may be indicated on the shoe 37 by means of the heads 40 of suitable one way passage pins 41 inserted into the shoe 37 in the vicinity of said portions 38 on the tube 36.

Arrow fins 42 on the sides of the pins 41 secure them against falling out from the body of the shoe 37.

The employment of the above inflating apparatus enables one to employ valveless inner tubes for automobile tires, which valveless tubes I propose to introduce.

When my above inflating apparatus is applied to tubes having thereon valves the latter may be disregarded and the tubes inflated as hereinbefore described.

Variations are possible and parts of my invention may be used without other parts.

I claim as my invention and desire to secure by Letters Patent:

1. An automobile tire comprising a shoe, a valveless inner tube enclosed thereby, one or more portions of said inner tube having the outer surface thereof covered by puncture sealing material and said shoe being adapted to permit a hollow needle to pass through the side thereof, whereby a hollow needle may be inserted through said shoe, and one of said portions for inflating the said tube thereby.

2. A valveless inflated article having the outer surface of one or more portions thereof covered by puncture sealing material wherethrough to insert a hollow needle for inflating the said article thereby.

3. A valveless inner tube for automobile tires having the outer surface of one or more portions thereof on the outer periphery and sides thereof covered by puncture sealing material, wherethrough to insert a hollow needle for inflating the said tube thereby.

NICHOLAS DEMAREST CAMPBELL.